G. L. SCHOFIELD.
AUTOMOTIVE TRACTOR.
APPLICATION FILED JULY 1, 1918.
1,356,475.
Patented Oct. 19, 1920.
7 SHEETS—SHEET 1.
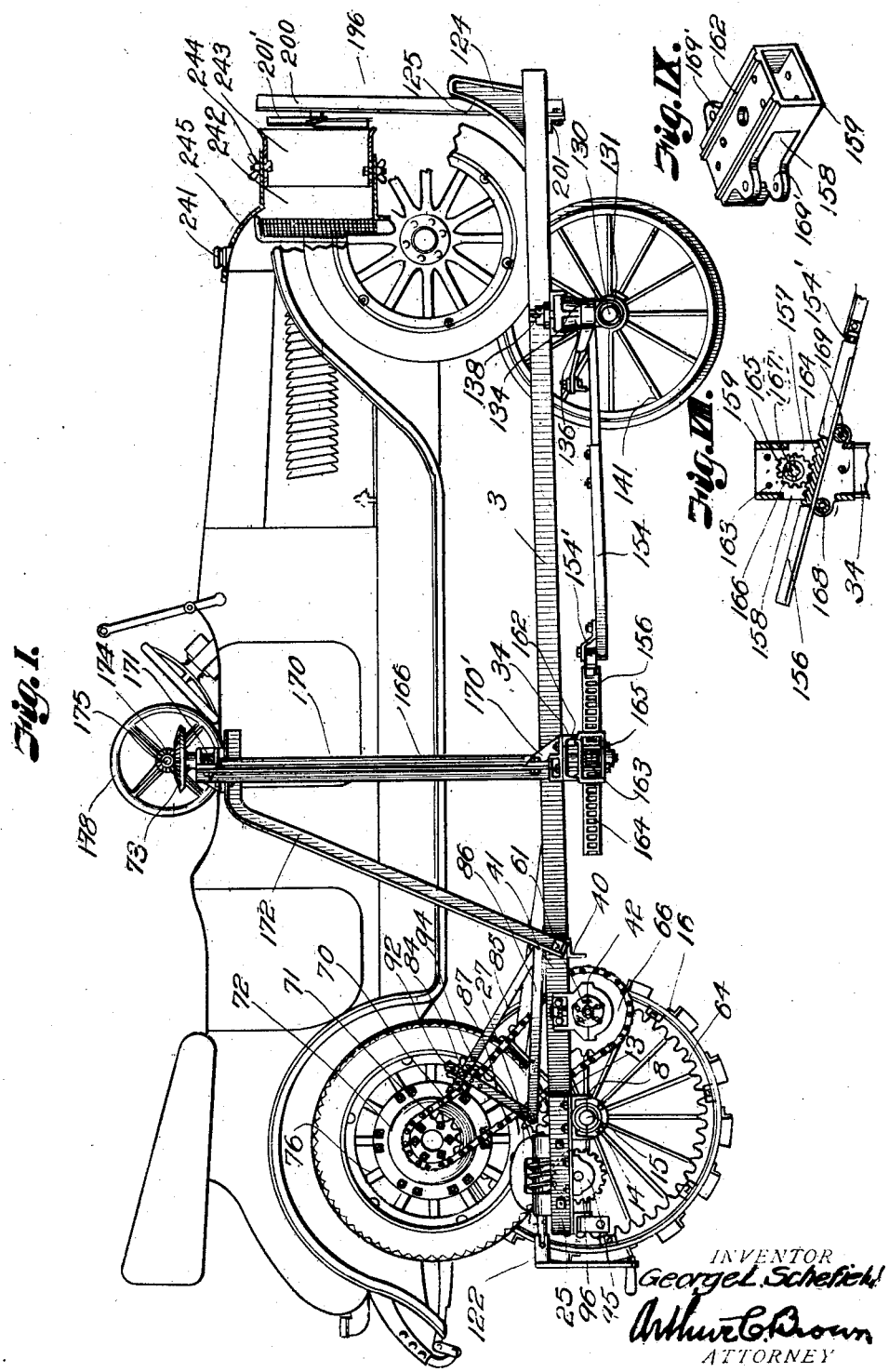
INVENTOR
George L. Schofield
Arthur C. Brown
ATTORNEY

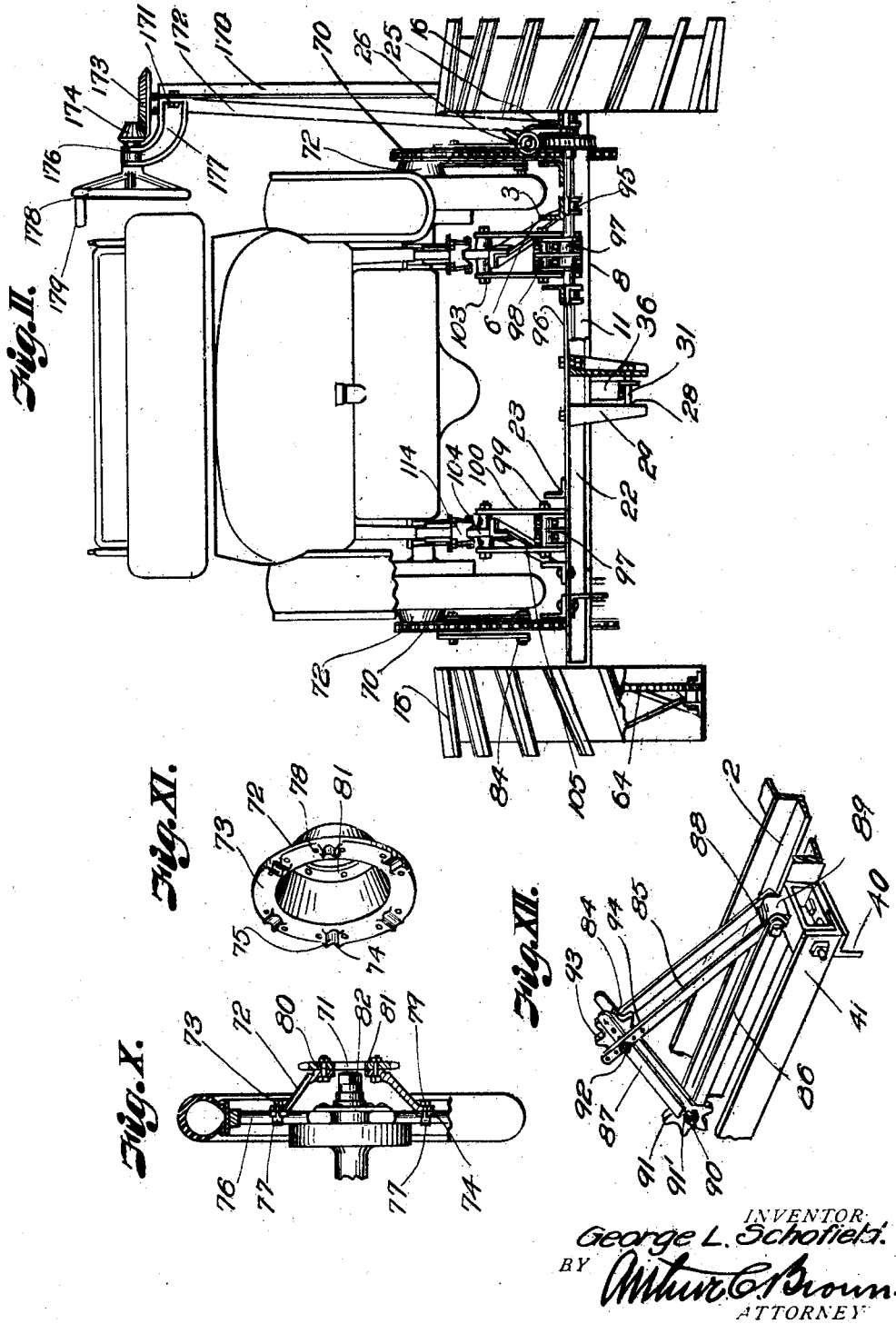

G. L. SCHOFIELD.
AUTOMOTIVE TRACTOR.
APPLICATION FILED JULY 1, 1918.
1,356,475.
Patented Oct. 19, 1920.
7 SHEETS—SHEET 3.
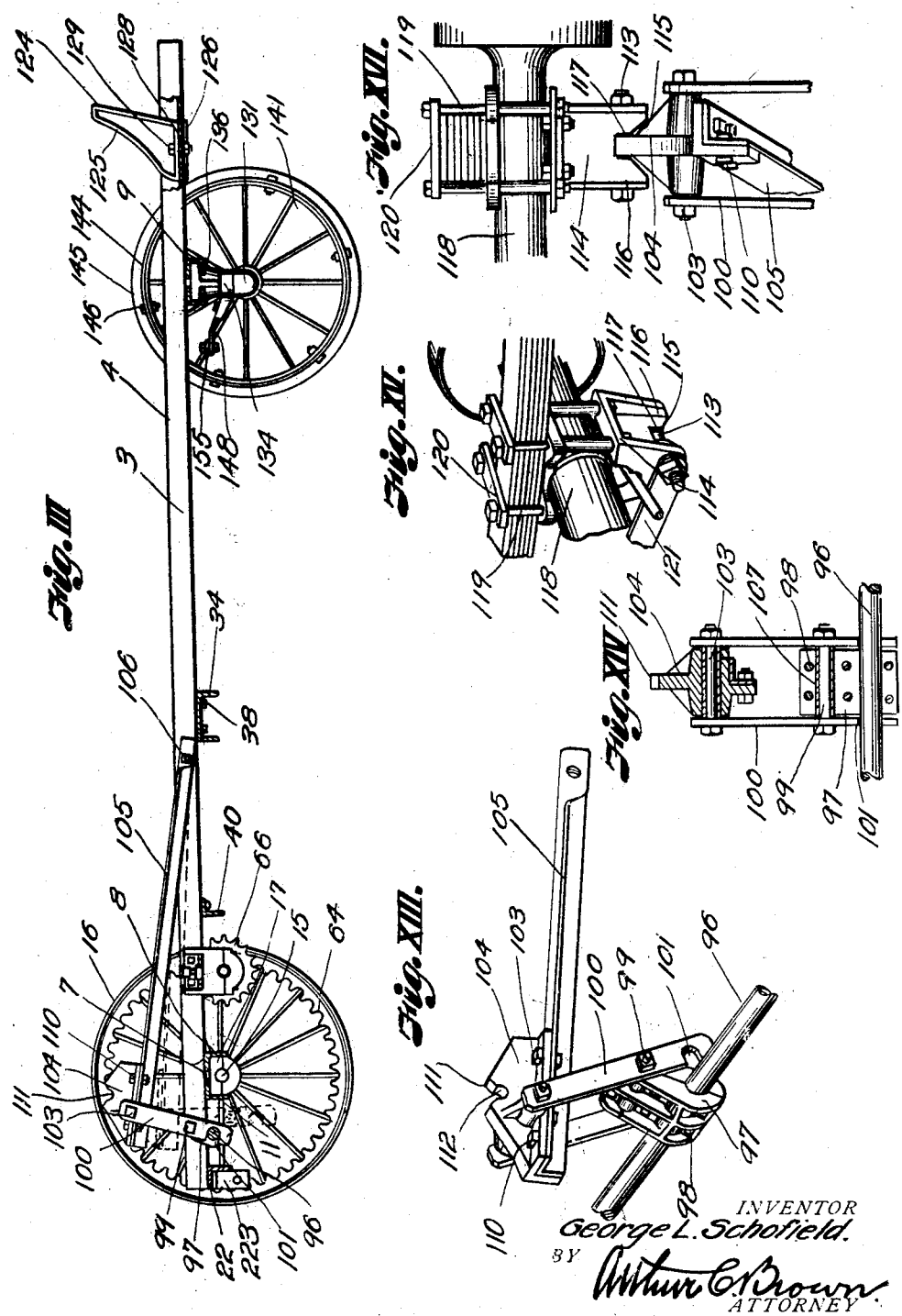
INVENTOR
George L. Schofield.
BY
Arthur C. Brown
ATTORNEY

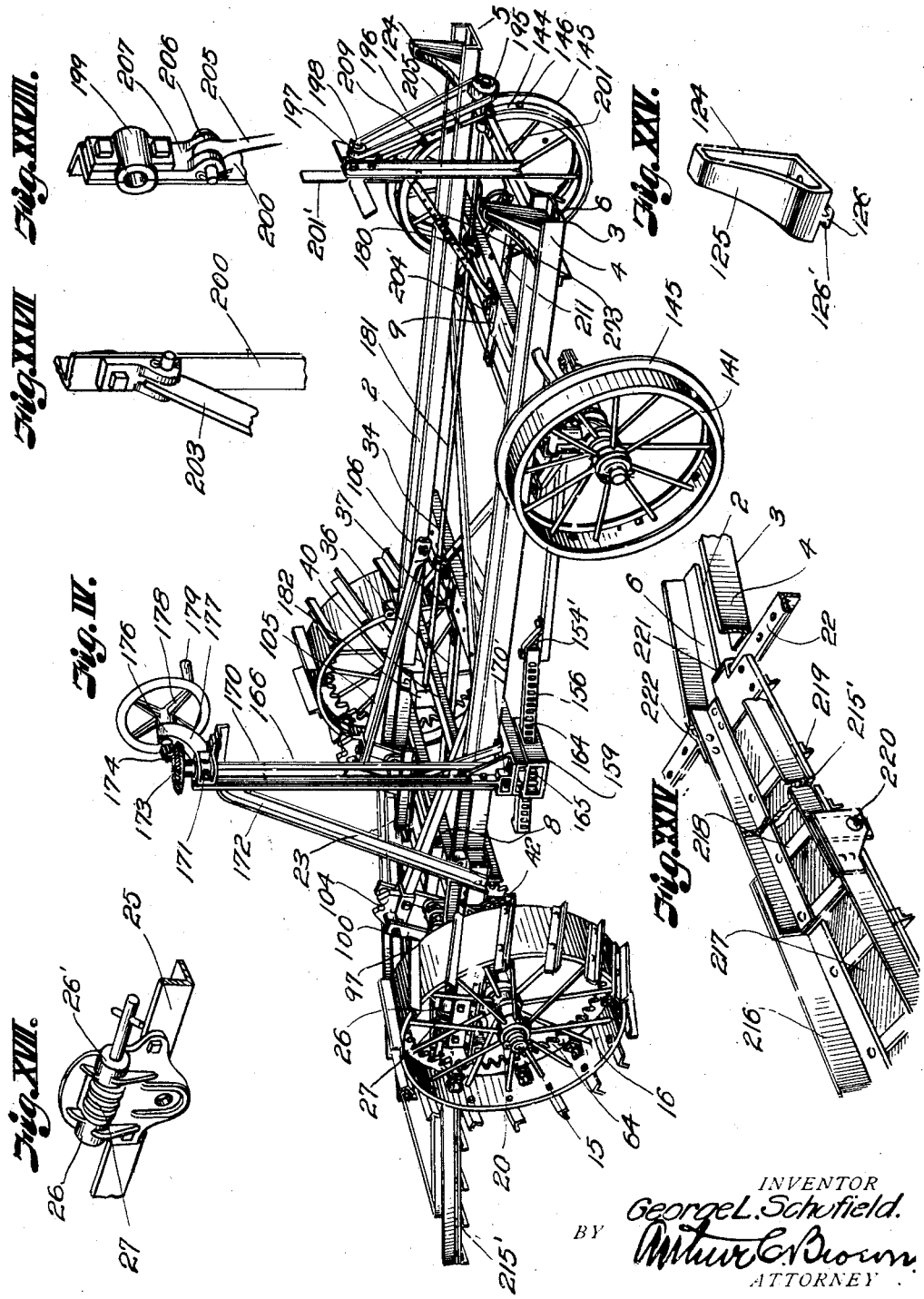

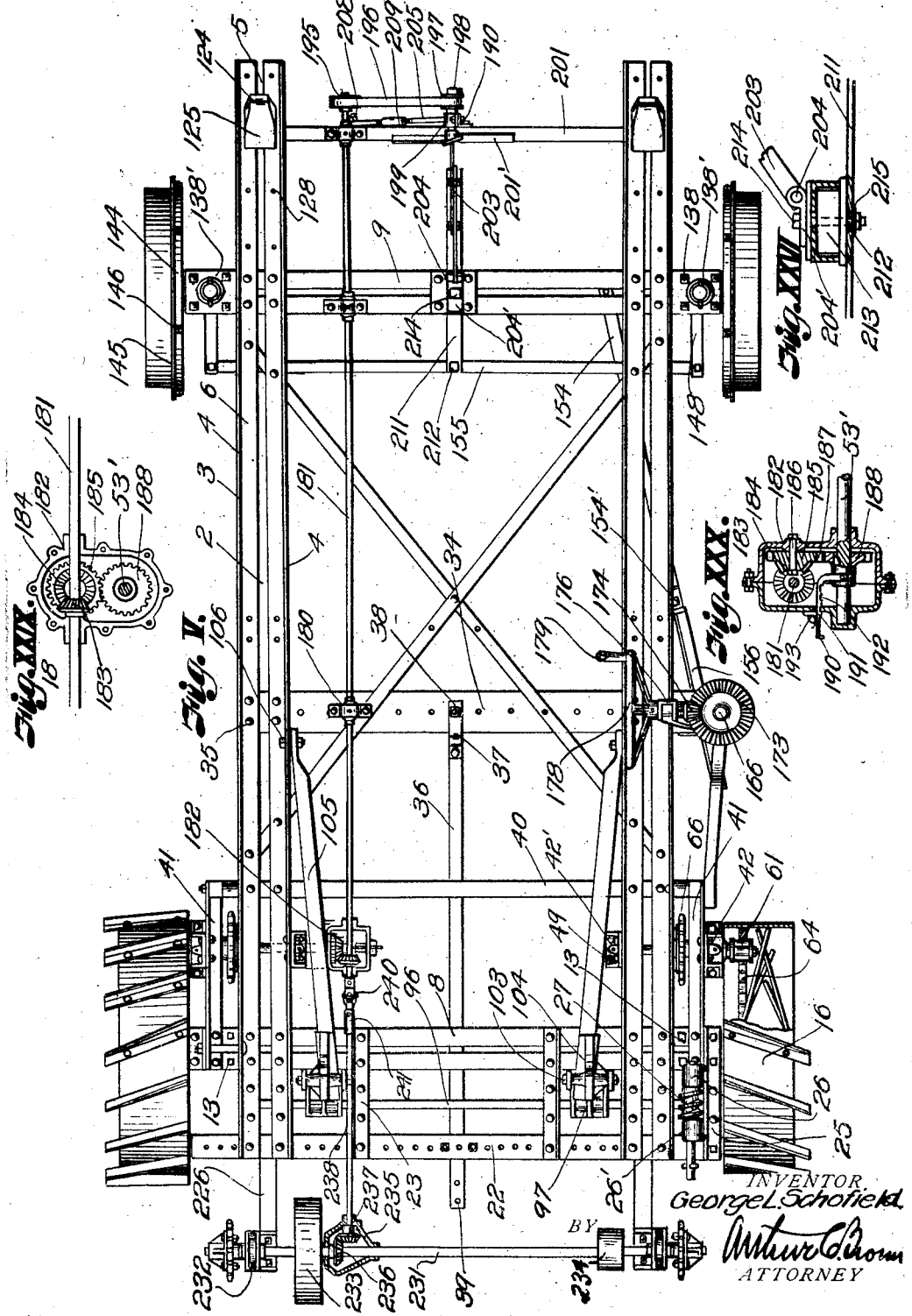

G. L. SCHOFIELD.
AUTOMOTIVE TRACTOR.
APPLICATION FILED JULY 1, 1918.
1,356,475.
Patented Oct. 19, 1920.
7 SHEETS—SHEET 6.
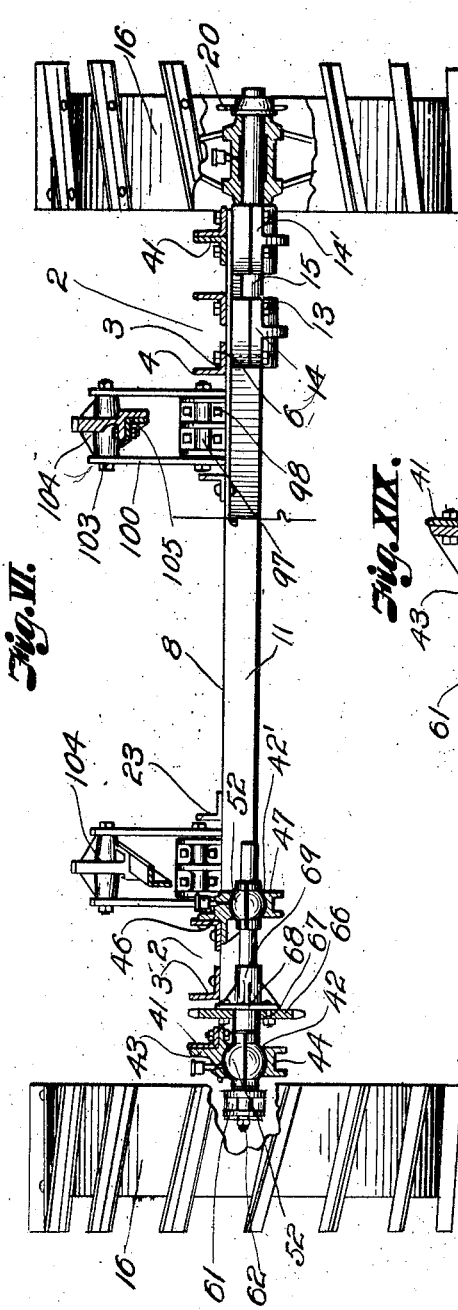
INVENTOR
George L. Schofield.
BY
Arthur C. Brown
ATTORNEY G. L. SCHOFIELD.
AUTOMOTIVE TRACTOR.
APPLICATION FILED JULY 1, 1918.
1,356,475.
Patented Oct. 19, 1920.
7 SHEETS—SHEET 7.
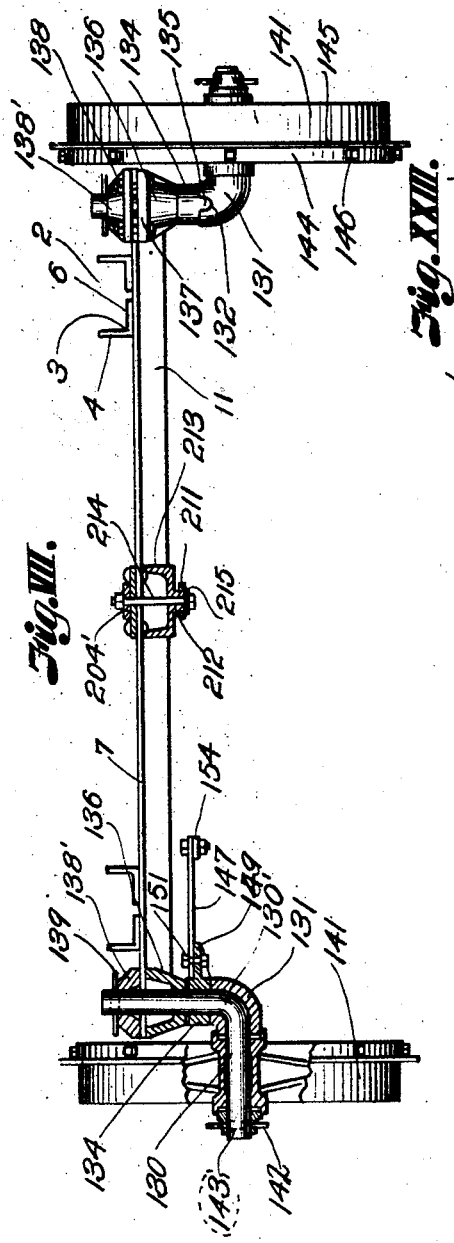
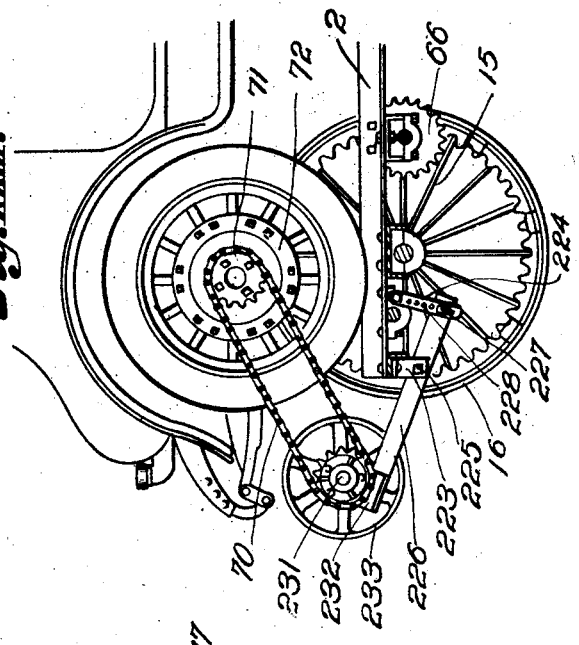
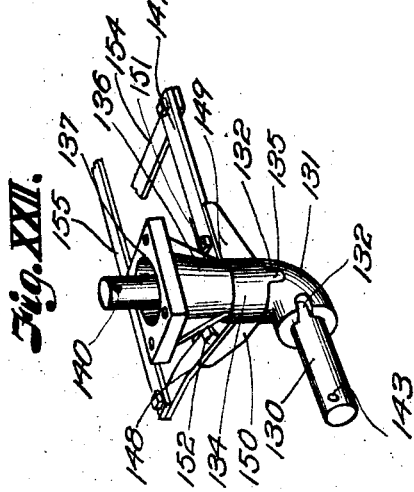
INVENTOR
George L. Schofield.
BY
ATTORNEY

UNITED STATES PATENT OFFICE.

GEORGE L. SCHOFIELD, OF KANSAS CITY, MISSOURI.

AUTOMOTIVE TRACTOR.

1,356,475.  Specification of Letters Patent.  Patented Oct. 19, 1920.

Application filed July 1, 1918. Serial No. 242,911.

*To all whom it may concern:*

Be it known that I, GEORGE L. SCHOFIELD, a citizen of the United States, residing at Kansas City, in the county of Jackson and State of Missouri, have invented certain new and useful Improvements in Automotive Tractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a tractor of such construction that the motor power may be supplied by the driving element of a motor vehicle temporarily supported by the tractor frame, it being one of the purposes of this invention to so associate the motor vehicle and the tractor frame that when the two are brought into coöperative relation, a substantially unitary structure is provided; the motor car merely providing the power.

With the contemplated arrangement, the motor vehicle may alternately carry out its usual functions as a pleasure car or the like or serve as the motor power for the tractor without disturbing the essential elements of the motor vehicle.

Heretofore it has generally been the practice to construct a motor vehicle chassis as well as a tractor frame as rigid as possible consistent with the weight permitted; the inequalities of the road surface being compensated for by springs or some equivalent means independent of the frame, this being necessary in order to maintain the transmission shaft in correct alinement.

I have provided a tractor frame consisting of side sills and cross sills, some at least of which having an inherent tendency to flex when the wheels strike inequalities in the surface over which the tractor travels. The inherent flexibility of the frame permits the wheels at all times to contact with the ground irrespective of any inequalities thereon, a condition deemed quite essential to the successful operation of a tractor.

In the drawings:

Figure I is a side elevation of an automotive tractor embodying my improvements.

Fig. II is a rear view of the same.

Fig. III is a longitudinal vertical section of the tractor frame.

Fig. IV is a perspective view of the frame.

Fig. V is a plan view of the frame, including the cooling mechanism and an auxiliary power attachment.

Fig. VI is an elevational view, partly in section of the rear axle and drive wheels.

Fig. VII is a similar view of the front axle.

Fig. VIII is a horizontal section of the steering rack box and a portion of the rack partly in section.

Fig. IX is a detail perspective view of the steering rack box.

Fig. X is a detail view, partly in section of one of the automobile wheels and its universal flange.

Fig. XI is a detail perspective view of the flange.

Fig. XII is a detail perspective view of a floating idler on the drive belt, connecting the automobile wheel with the drive shaft of the frame.

Fig. XIII is an enlarged detail perspective view of the jack for elevating the rear of the automobile from the frame.

Fig. XIV is a vertical section of the jack illustrating the mounting of the toggle arm.

Fig. XV is a detail perspective view of the universal jack saddle on the car axle.

Fig. XVI is an end view of the same illustrating the positions of the axle and jack saddle members.

Fig. XVII is a perspective view of the toggle shaft screw and its mounting.

Fig. XVIII is a detail perspective view of a jack shaft and its universal bearings.

Fig. XIX is a longitudinal section of part of a jack shaft and its bearings.

Fig. XX is a perspective view of the jack shaft bearing illustrating its mounting on the frame.

Fig. XXI is a longitudinal section of a part of the rear axle shaft and a traction wheel illustrating the shaft mountings.

Fig. XXII is a detail perspective view of one of the front axle spindles illustrating the arrangement of steering levers.

Fig. XXIII is an enlarged side elevation of parts of the frame and automobile illustrating an auxiliary power attachment.

Fig. XXIV is a detail perspective view of one of the removable runways illustrating its attachment to the frame.

Fig. XXV is a detail perspective view of one of the stops at the front of the frame.

Fig. XXVI is a vertical section of the front cross beam and parts of the tow bar and fan standard brace.

Fig. XXVII is a detail perspective view of part of the fan post and its longitudinal brace.

Fig. XXVIII is a perspective view of the upper end of the fan post showing the fan bearing.

Fig. XXIX is a longitudinal section of the transmission case.

Fig. XXX is a cross section of the transmission case.

The tractor frame is shown as consisting of side sills and end sills, each of which is preferably constructed so as to have an inherent tendency to flex, although under some condition only one set, for example, the side sills may flex.

The side sills 2 (see Figs. V and VI) may consist of pairs of angle bars 3, the upstanding vertical flanges 4 being spaced apart to provide grooved retaining run-ways to guide the wheels of the motor vehicle on to horizontal flanges 6 which constitute the floors of the run-ways. The horizontal flanges 6 of the side sills rest upon the top horizontal flanges 7 of the end sills 8 and 9 which are fastened with respect to the angles of the side sills so that their vertical flanges 11 on the outer edges of the angles project downwardly as shown.

Each angle piece of an end sill is attached to an angle piece of a side sill preferably by a single fastening device to unite the parts in an integral structure, and at the same time assist in the flexibility of the frame because of the single point connection, although a single point connection may not be assembled under all conditions.

The end sill 8 extends beyond the sides of the side sills 2, and fixed in the downwardly facing channel at each end of the sill preferably by bolts 13, are bearings 14—14′ (Figs. VI and XXI) for receiving the inner end of a stub axle 15 that projects beyond the end of the end sill and carries a traction wheel 16 of any suitable type. The bearings 14—14′ are halved horizontally and the lower part of each provided with a stud 17 which projects into the bearing channel and is adapted for seating in an aperture 18 or socket 19 in the stub axle 15. The socket 19 is arranged at the center of the axle so that the aperture 18 may receive the stud 17 of the inner bearing member or, when the axle is reversed, may receive the cotter pin 20 that holds the traction wheel on the axle. With this construction should the axle wear, it may be reversed, with the cotter pin parts fit as described, with the aperture which had previously received the stud 17 of the inner bearing.

At the rear of the frame is a cross bar 22 (Fig. V) which is connected with the rear end sill 8 by angle strips 23, having single bolt connections with the end sill and bar 22 in order to carry out the scheme of flexibility and give the proper strength; said cross bar 22 serving to brace the main frame and provide support for an angle strip 25 at one side of the frame that carries the bracket 26 having bearings 26′ within which a screw shaft 27 is revolubly mounted. Bar 22 also carries a yoke 28 (Fig. II) comprising hangers 29, which are bolted to the bar 22 and a cross bolt 31 that is carried by said hangers. Pivotally mounted on a cross beam 34 (Fig. V) that is suspended from the longitudinal beams 2 at about the center of the frame, by bolts 35, is a draw bar 36, having a yoke 37 at its forward end straddling the bar 34 and connected thereto by a bolt 38. The rear end of the bar 36 extends through the guide yoke 28 and has apertures 39, through which a hitch for a plow or other implement or vehicle (not shown) may be attached to the tractor frame. It is apparent that the pivotal mounting of the draw bar affords automatic adjustability for the drawn member and thus by adjustment of the yoke 28 the draw bar may be fixed in an adjusted position.

Suspended from the side sills 2, forwardly of the rear axles 15, is a bar 40, also having single point connection with the side sills 2, and mounted on the ends of said bar and fixed to the rear end sill 9, at each end of the bar, is an angle strip 41. Fixed to and suspended from the vertical flange of each angle strip 41 is a journal box 42 (Figs. XIX–XX) comprising an upper member 43 which is attached to the side of the angle flange, and a lower member 44, which is suspended from the member 43 by bolts 45. Likewise fixed to the vertical flange of the inner longitudinal frame member 3 is the upper portion 46 of a journal box 42′, the lower member 47 of which is attached to the upper member by bolts 49 (Fig. V), which extend through apertures 50 and 51 in the journal box 42. Each of the lower members of bushings 52 in which the jack shaft is mounted is provided with a socket 58 for receiving a stud 59 formed integral with the lower bearing members 44 and 47 to prevent the bushings from rotating in the boxes. The fit of studs 59 in their sockets is sufficiently free to permit universal movement of the jack shaft that carries out the flexible scheme of the main frame.

The outer end of each jack shaft is tapered to form a cone bearing for a driving pinion 61 that is fixed on the shaft and held in place by a nut 62 that threads onto the end of the shaft. Each pinion 61 meshes with an internal gear 64 (Fig. V) fixed to the inner face of the rim of the adjacent traction wheel 16, so that each wheel is driven from its individual jack shaft. A sprocket wheel 66 is attached to each jack shaft, preferably by bolts 67 that extend through the sprocket wheel and through the flange 68 of a collar 69 that is keyed on said shaft. A chain 70 (Fig. I) runs over each sprocket wheel 66 and over a sprocket wheel 71 on the rear wheel of a motor car that is superimposed on the frame when the tractor is properly assembled.

The sprocket wheel 71 preferably attached to the car wheel through a flange 72 (Figs. X and XI) that is adapted for universal application to wheels of this character so that the flange may be made up as stock equipment and easily and quickly applied to the wheel of any motor car. The preferred construction of the flange comprises a frusto-conical body having an annular rim 73 at its base provided on its face with bosses 74, having radial sockets 75 for receiving the spokes 76 of the motor car wheel, the socket bosses being arranged at determined intervals corresponding to the spacing of the motor car wheel. In the present drawings, I have illustrated six bosses, which are adapted for application to alternate spokes of a twelve-spoke wheel, although it is apparent that this number of sockets is not essential. To attach the flange to the wheels, I provide clips 77, which fit over the wheel spokes and extend through apertures 78 in the flange rim 73 and secured by nuts 79. The sprocket wheel 71 is preferably attached to the flange by bolts 80, which extend through the body of the sprocket wheel and through an inturned rim 81 at the smaller end of the flange, the sprocket wheel and the end of the flange being open to accommodate the hub cap 82 of the motor car wheel.

With the parts assembled and power applied from the motor car to the frame, the drag on the belt 70 is upwardly on the rear run of the belt. Consequently the rear run is taut, while the forward run is loose and may rattle to throw the belt from the sprocket wheel or permit the belt to slip. To obviate any such disadvantage, I have provided a floating idler, preferably comprising a triangular frame 84 (Figs. I and XII) which may be constructed of straps 85—86 and 87. The straps are arranged in pairs, as illustrated, with the straps 85 and 86 pivotally mounted on a bolt 88 carried by a block 89 that is anchored between the vertical flanges of one of the side beams 2 and the angle strip 41. The rear ends of the straps 86 and 87 are connected by a bolt 90, carrying an idler sprocket wheel 91, on a thimble 91', straps 85 and 87 are connected by a bolt 92 and revolubly mounted on the bolt 92 is an idler sprocket wheel 93. The bolt 92 that connects the straps 85 and 87 may extend through any one of several apertures 94 in the ends of said straps to effect adjustment of the idler frame to the drive belt 70 with which it is to be used. In applying the idler, the belt 70 is run over the power sprocket wheels 66 and 71. The idler frame is then adjusted, by positioning the bolt 92 to retain the drive belt 70. With the parts so arranged the belt will work between the idler wheels so that the taut run of the belt will hold the opposite idler against the loose run of the belt and avoid lost motion of the belt relative to its sprocket wheels.

While the front wheels of the motor car may rest on the frame beams when the parts are assembled, it is apparent that the rear wheels must be out of contact with the frame or the car would be driven on over the front of the frame. I provide against such contingency by elevating the rear end of the motor car after it assumes its position on the main frame, by mechanism of which the following is the preferred form:

Journaled in bearings 95 that are preferably suspended from the side beams 2 of the main frame, is a transverse shaft 96 (Figs. I, V and XIII). Fixed on said shaft, adjacent to each side beam, is a split toggle block 97, the members of which are connected rigidly by bolts 98 to clamp the block to the shaft. Pivotally connected with each block, by a bolt 99, are toggle arms 100, having edge sockets 101, adapted to fit snugly over the shaft 96 when the toggle, composed of the arms 100 and block 97, is straightened as presently described. The upper ends of the arms 100 are tied to a centering head 104 which is pivotally connected with an adjacent frame beam by a bolt 106. The bolt 99 which connects the toggle arms, preferably extends through a thimble 107 in the block 97 to tie the toggle arms, the thimble affording a free mounting on which the block may turn to insure free movement of the block and arms. The bolt 103 carries a thimble on which the head 104 pivots to provide free movement and space the toggle arms. Each centering head 104 is attached to its arm 105 by bolts 110 and has a socket 111 in its upper face, comprising a circular seat 112 adapted for snugly seating a bearing pin 113 (Fig. XV) on a saddle 114 that is suspended from the rear axle of an automobile, and a tapering mouth 115 that is adapted for guiding the head to place on the pin 113. The pin 113 is carried in the depending ears 116 of the saddle 114, the saddle mouth being tapered and the pin extended across the downwardly facing opening 117 in the saddle. The block 114 is attached to the rear axle 118 of the motor car by bolts 119 and straps 120 of a type commonly used for mounting a vehicle spring, this part of the equipment, except for the body of the block 114, being that ordinarily found on motor cars. In order to brace and stiffen block 114, I preferably provide same with a strap 121 which may be connected to the block through the pin 113 and attached to a part (not shown) of the motor car. It is apparent that with this toggle mechanism, the shaft 96 may be actuated by a crank 122 (Fig. I) and the toggle straightened by elevation of the lower toggle block 97 to elevate the rear portion of the motor car and lock the jack in operative position by seating the shaft in the sockets of the toggle arms as heretofore described.

It is apparent that, were the tractor frame level, when the rear end of the motor car is jacked up to free the drive wheels of the car from the frame, the car would be inclined, perhaps to such an extent as to interfere with proper flow of fuel. To obviate such advantages, I support the front of the frame higher above the front wheels than above the rear wheels, so that the tractor frame slants sufficiently to compensate for the elevation of the rear of the car. Consequently the motor car rests at an incline when first driven onto the frame, but assumes a horizontal position when jacked up for service.

To properly locate the motor car on the supporting frame initially and prevent its accidental forward displacement, I have provided abutments at the front of the frame comprising stop heads 124, preferably cast to fit within the channels of the side beams 2, the blocks being substantially triangular and having arcuate rear faces 125 to receive impact from the front wheels of the car. The blocks 124 may be adjusted to the frame to adapt the frame to motor cars of different make and wheel base by providing the underside of each block with a flanged head 126 (Fig. XXV) that is adapted for projection through the slot 5 formed by the spacing of channel members of the side frames so that the flanges 126' on the head engage the underside of the beam and hold the block to its seat. The block may also be attached to the frame by bolting or otherwise. As the wheel bases of most motor cars are of different length, the frames may be provided with perforations 128 (Figs. III and V) at intervals corresponding to the differences in wheel bases, so that bolts 129 may be extended through the flanges in the bases of the stops 124 and through the apertures 128 to securely but adjustably mount the stops.

In order to further carry out the scheme of flexibility in the frame, I utilize individual front axles for the steering wheels, each comprising a steel shaft 130 (Figs. VII and XXII) bent to a right angle 130' and having an elbow 131 cast thereon. The elbow 131 has end sockets 132 and fitting over the spindle is a collar 134 having an ear 135 seated in a socket 132 to hold the collar against rotation on the axle, or rather to induce rotation of the spindle with the collar, as it is to this collar that the steering mechanism is attached as presently described.

Also mounted on the vertical spindle, is a bearing 136, having a head 137 which bears against the underface of a cross beam 9 of the main frame and is rigidly attached thereto by bolts 138 that extend through apertures in the beam parts and suspend the bearing. The axle extends up through the cross beam into a cap 138' that is seated on said beam, and a cotter pin 139 extends through an aperture 140 in the top of the axle member to support the axle on the cap and prevent the same from dropping through its bearing, should the frame be lifted from the ground support. The ground wheel 141 is rotatably mounted on the horizontal member of the shaft and held in place by a cotter pin 142 that extends through an aperture 143 in the end of the axle in the customary manner. The angle members of the axle are of equal length so that should the bearing member wear it may be reversed, the socket 132 in the end of the elbow facing the wheel being idle but receiving the lug on collar 134 when the axle is reversed. The wheel 141 is preferably adapted for field work by the application of an anchoring flange 144 to its rim, the said flange having a lateral rail 145 seating on the wheel rim and attached thereto by bolts 146. With this construction the flange will travel in a furrow and automatically guide the tractor.

The steering mechanism is connected with the collar 134 on the spindle by straps 147 and 148 which are attached to ears 149 and 150 on the collar, preferably by bolts 151 and 152, the strap 147 leading to the main steering mechanism through a link 154 and the strap 148 being attached to the connecting rod 155, whereby both front axles are operated synchronously through the connection. It is apparent that while both axles have the connecting strap 148, but one of the axles need have the main steering connection 147, as operation of one of the axles by the steering mechanism will operate the other through the connecting rod. The steering link 154 is provided, at its rear end, and preferably through a pin and collar connection 154', (Figs. I, VIII and IX), with a rack 156, which extends through the front and back slots 157—158 in a box 159 that is suspended from the cross beam 34 at about the center of the frame. The beam 34 preferably comprises a channel iron which may be connected at different points with each member of the side beams, as its location at the center of the frame will not impart undesirable rigidity to the frame and interfere with its flexible action. The box 159 is preferably provided with lips 162 which project up into the channel of the beam 34, bolts 163, which attach the box to the beam, retain the lips snugly against the underside of the beam. The teeth 164 on the side of the rack bar 156 engage a spur wheel 165 that is keyed on a vertical shaft 166 rotatably mounted in the boxing and held against vertical displacement by a cotter pin 167 that may bear against the bottom of the box, the rack bar being held in mesh with the spur wheel by rollers 168 that are rotatably mounted on pins 169 carried by ears 169' on the box. The movement of the rack bar is free to provide easy manipulation of the steering axles through the mechanism which I will now describe.

The shaft 166 extends upwardly along a standard 170 that is attached to the beam 34, preferably by a bracket 170' (Fig. IV) and is journaled at its upper end in a bracket 171 carried by said standard. The standard is also braced by an arm 172 that is fixed thereto and to the angle member 41 that carries the local jack shaft. Keyed on the upper end of the steering shaft 166 is a bevel gear wheel 173 and meshing with said gear wheel is a pinion 174 on a pin 175 that is journaled in the bearing 176 on an arm 177 preferably forming a part of the bracket 171. Fixed on the pin 175 is a steering wheel 178, having a handle 179 whereby the wheel may be easily operated by the occupant of the motor car when the car is superimposed on the carrying frame and properly located thereon.

In order to secure sufficient power from the motor car for the purpose of accomplishing the results desired from the apparatus, it is necessary to run the motor at high speed and gear the same down to secure the multiplication of power. Continued operation of the motor under such conditions in some cases requires additional cooling facilities which I have provided for as follows:

Journaled in universal bearings 180 (Figs. V and XXVI to XXX) on the frame is a shaft 181, the rear end of which extends through a gear housing 182 and carries a beveled gear wheel 183 which constantly meshes with the bevel gear face 184 on a wheel 185 which is mounted on a stub shaft 186 in the gear housing. The wheel 185 also has peripheral gear teeth 187 which are adapted to mesh with a gear wheel 188 that is slidably keyed on an extension 53' of the adjacent jack shaft 53, so that when the mechanism is in operation and the gears in the housing 182 in mesh, the fan shaft is constantly operated. The gear wheel 188 on the jack shaft may slide on the shaft and is provided with a shipper lever 190 that extends out through a slot 191 in the housing and has notches 192 adapted for selective engagement with the edge of the slot to hold the gear wheel in functional or non-functional relation with the fan shaft gear, the lever being yieldingly held in adjusting position by a spring 193 that is fixed on the housing and engages the shipper lever. At the forward end of the shaft 181 is a belt wheel 195 (Figs. IV and V) and running over said wheel is a belt 196, which also runs over the wheel 197 on a shaft 198 that is mounted in a bearing 199 on a standard 200 that is fixed to a cross bar 201 at the front of the frame, preferably by suspension from the side beams 2, fixed on the rear of said shaft 198, in a position directly in front of that normally occupied by the radiator of the superimposed motor car, is a fan 201', whereby a cooling blast is delivered into the radiator when the apparatus is in use. The standard 200 is braced from the main frame by an adjustable bar 203 that is preferably anchored to the front cross beam 9 by a pin 204 on a bracket 204' on said beam. The standard is also braced radially in the line of belt tension by a rod 205 that is anchored at its upper end in a yoke 206 on the bracket 207 that carries the fan shaft bearing, and at its lower end is connected with a pin 208 on the cross bar 201. One or both of said adjustable brace rods may effect its adjustment through a turn buckle 209, although such specific adjusting mechanism is not essential.

As the movement of the assembled tractor is necessarily slow because of the reduction gearing heretofore mentioned, it is preferred, when taking the tractor to and from a point of use, to tow the frame from the motor car. This is preferably effected through a tow bar 211 (Figs. VII and XXVI) that is pivotally mounted on the boss 212 on a block 213 that is suspended from the front axle beam 9 by a bolt 214. The bolt 214 carrying a washer 215 that serves to support the tow bar, while leaving it free to pivot on the boss and draw thereagainst. The tow bar extends rearwardly from its bolt connection and is attached to the steering connecting rod 155 by a pin or bolt 212. With this arrangement the tractor frame may be towed by the motor car and, when turning a corner, the frame is steered with the motor car through the connection of the tow bar with the steering mechanism of the frame.

To run the car onto and off of the frame, I provide approach runways 215', (Fig. XXIV) preferably comprising side angles 216, spaced to form a runway preferably flared toward its outer end and having a flooring composed of a base plate 217, transverse tread strips 218 and stiffening angles 219. Each runway is preferably composed of two sections, having pivotal connection through a bolt 220, so that the runways may be folded to occupy the least possible space, the rear portion of the outer end section, fitting within the larger base section to form a closed side of the hinge. The inner end of the runway is provided with a hook 221 that may take over the rear cross bar 22 to support the runway and has a latch 222 adapted for coöperation with one of the angle bars of the relative side frame to register the removable runway with the permanent runway formed by said side beam. It is apparent that the removable runway may be applied when the motor car is to be run onto the frame and removed as soon as the car is in place, and may be carried with the apparatus to form part of the permanent equipment thereof.

The power developed in the apparatus can be applied to other uses, such as stationary mills, saws or the like, through an auxiliary power attachment that may be mounted on the frame and connected with the driving sprocket of the motor car as follows:

223 (Fig. XXIII) designates a strap that is suspended from the rear cross bar 22 and 224 designating a strap that is suspended from the side beam of the main frame, there being a pair of the straps 223—224 at each side of the frame. Pivotally mounted on a bolt 225 on the strap 223 is an arm 226, the front end of which is anchored to the strap 224 by a bolt 227 that may extend through any one of several apertures 228 in said strap to fix the elevation of the upper end of the arm 226 and thereby adapt the auxiliary power mechanism to the drive belt 70. This is the same driving belt that runs over the sprocket wheel on the jack shaft and it may be adjusted to the auxiliary power mechanism by location of the bolt 227 in the proper aperture in strip 224. A shaft 231 is journaled in bearings 232 (Fig. V) on the arms 226 and fixed on the shaft 231 is a belt wheel 233 over which a belt (not shown) may be run to operate the auxiliary machine.

Other wheels, like that numbered 234, may also be applied to the shaft for any special use.

Also fixed on the shaft 231, within a gear case 235, is a beveled gear wheel 236, which meshes with the bevel gear wheel 237 on a shaft 238 that extends forwardly and has universal connection, through a joint 240, with the fan shaft 181 that extends from the gear housing 182, as heretofore described. It is apparent that the auxiliary power mechanism may be easily and quickly applied to the main frame so that it may be used only when desired and at other times may be properly stored.

To effect assembly of the auxiliary power attachment as a unit, I provide for disconnecting the shaft 238 from the shaft 181 through a collar and pin joint 241 of any suitable construction.

With the parts properly constructed and assembled, the use of the apparatus is as follows:

Assuming the use to be that for farm purposes and the tractor to be normally housed at a point remote from that of use, to bring the tractor to the point of use the frame is hitched to the rear of the motor car by the tow bar and conducted at a fair rate of speed to the field or other place of use. When the field is reached, the removable runways are applied to the rear end of the frame. In registration with the main runways and the motor car run onto the frame until its front wheels are stopped by the abutments 124. When the motor car is in position, drive belts are applied to the car wheel and jack shaft sprockets and the jack mechanism is operated by the crank 122 so that the shaft 96 is revolved through the worm gear. The revolution of the shaft carries the blocks 97 upwardly, straightening the toggles and elevating the centering heads 104. Upward movement of the centering heads carries the socket members against the pin 113 on the saddle 114 on the rear axle of the motor car, the head centering automatically on the pin to seat the pin in the socket 112. The sockets in the lower portions of the toggle arms move over the shaft 96 when the toggle is straightened, to lock the jack in elevated position in order to prevent accidental displacement of the parts that might result in the lowering of the car prematurely.

When the motor car is jacked up as described, the floating idlers are adjusted to avoid lost motion of the belts. The tractor is then ready for use and the operator takes his seat in the motor car as in the ordinary use of the car.

The ordinary car steering mechanism is not employed, as there is no connection between the steering mechanism of the car and that of the frame, the steering being effected wholly through the wheel 178 and the rack mechanism operated thereby, as heretofore described.

When the tractor is in operation, the pull is steady because of the fly wheel action of the motor car wheels.

There is no undue strain on the frame when moving over uneven ground, because of the flexibility in the frame, and the control is effective through the steering mechanism.

As the operation of the towing, cooling and other parts has been described during the description of the construction, description of their use will not be repeated. Neither will any detail mention be made of the many and varied uses for which the apparatus is adapted as it is apparent or may be developed from experience.

In order that the cooling air from the fan 201 may be discharged directly upon the radiator of the motor vehicle, I have provided an extensible hood which may be interposed between the fan and the radiator. The extensible hood is preferably supported from the filling cap 241 on the motor vehicle. The hood is shown as comprising two tubular sections 242 and 243 and these may be secured in any adjusted position by the set screws 244. The section 242 has a perforate bracket 245 which fits over the filling cap 241 to support the hood. The section 243 of the hood is flared at its end adjacent to the fan to ease the stream lines of air into the hood.

Having thus described my invention, what I claim to be new therein, and desire to secure by Letters-Patent, is:—

1. A tractor frame, bearings in said frame and a reverse stub wheel axle mounted in said bearings, said axle comprising a shaft having transverse through openings near its respective ends, a recess midway between its ends and projections in the bearings to engage one of the through openings and the recess.

2. A tractor frame comprising front and rear sets of ground wheels and a body, the body supported higher at one end than at the other, and hoist mechanism at the lower end of the body for raising one end of a motor vehicle from the frame to space the driving wheels of the vehicle from the frame, and means for connecting the power mechanism of the vehicle with one set of ground wheels of the frame.

3. A tractor frame comprising front steering wheels and rear traction wheels and a body, means supporting the body higher above the rear wheels than above the front wheels, hoist mechanism on the rear of the frame engageable with a superimposed motor vehicle to raise the rear of the vehicle, and means for operatively connecting the power mechanism of the motor vehicle with the traction wheels of the frame.

4. A chassis for tractors having inherently flexible side sills and end sills, the side sills and end sills being connected one to the other by a single fastening element whereby the entire frame may flex to maintain traction for the wheels without imparting twisting stresses to the sills.

5. A chassis for tractors having flexible side sills and end sills, and means for connecting the side sills to the end sills whereby the entire frame may flex to maintain traction for the wheels without imparting twisting stresses to the sills.

In testimony whereof I affix my signature.

GEORGE L. SCHOFIELD.